US010876569B2

(12) United States Patent
Archer (10) Patent No.: US 10,876,569 B2
(45) Date of Patent: Dec. 29, 2020

(54) LOCKING NUT OR BOLT AND WASHER (71) Applicant: Kenneth Maxwell Archer, Lesmurdie (AU)

(72) Inventor: Kenneth Maxwell Archer, Lesmurdie (AU)

( * ) Notice: Subject to any disclaimer, the term of this patent is extended or adjusted under 35 U.S.C. 154(b) by 240 days.

(21) Appl. No.: 15/747,775

(22) PCT Filed: Jul. 28, 2016

(86) PCT No.: PCT/AU2016/050673
§ 371 (c)(1),
(2) Date: Jan. 26, 2018

(87) PCT Pub. No.: WO2017/015717
PCT Pub. Date: Feb. 2, 2017

(65) Prior Publication Data
US 2018/0231049 A1 Aug. 16, 2018

(30) Foreign Application Priority Data

Oct. 27, 2015 (AU) .................................. 2015904408

(51) Int. Cl.
*F16B 39/34* (2006.01)
*F16B 39/26* (2006.01)
(Continued)

(52) U.S. Cl.
CPC .............. *F16B 39/34* (2013.01); *B02C 17/22* (2013.01); *B02C 23/00* (2013.01); *F16B 39/26* (2013.01);
(Continued)

(58) Field of Classification Search
CPC ........ F16B 21/18; F16B 33/004; F16B 39/10; F16B 39/24; F16B 39/26; F16B 39/284;
(Continued)

(56) References Cited

U.S. PATENT DOCUMENTS 1,384,019 A 7/1921 Johnston et al.
2,761,349 A 9/1956 Heller
(Continued)

FOREIGN PATENT DOCUMENTS

CA 2933644 A1 6/2015
GB 1219868 A 1/1971

OTHER PUBLICATIONS

International Search Report of PCT Patent Application No. PCT/AU2016/050673 dated Sep. 27, 2016.
(Continued)

*Primary Examiner* — Roberta S Delisle (57) ABSTRACT

An improved locking nut and sealing washer for use with a threaded bolt. The locking nut has a flange. The sealing washer is attached to an elastomer and has retaining means provided therein. When the locking nut is seated on the sealing washer, a removable retaining insert may be manipulated to be received within the retaining means. Thereafter, when force is applied to the locking nut to move the locking nut in a first direction along the threaded bolt, the flange pushes against the sealing washer to push the sealing washer in the same direction and, when force is applied to the locking nut in an opposing direction along the threaded bolt, the flange pushes against the retaining insert to push the sealing washer in the same direction.

19 Claims, 11 Drawing Sheets

(51) Int. Cl.
  *B02C 17/22* (2006.01)
  *B02C 23/00* (2006.01)
  *F16B 43/00* (2006.01)
  *F16B 39/284* (2006.01)
  *F16B 41/00* (2006.01)
(52) U.S. Cl.
  CPC .......... *F16B 39/284* (2013.01); *F16B 43/001* (2013.01); *F16B 41/002* (2013.01)
(58) Field of Classification Search
  CPC ........ F16B 39/34; F16B 41/002; F16B 43/00; F16B 43/001
  USPC ........... 411/371.1, 371.2, 372, 432, 533, 542
  See application file for complete search history.

(56) References Cited

U.S. PATENT DOCUMENTS

| | | | |
|---|---|---|---|
| 2,870,812 A | | 1/1959 | Heller |
| 2,872,961 A | * | 2/1959 | Mills ..................... F16B 43/001 411/303 |
| 2,943,661 A | | 7/1960 | Stern |
| 3,550,498 A | * | 12/1970 | Briles ..................... F16B 37/00 411/432 |
| 3,678,979 A | | 7/1972 | Bjorklumd |
| 3,742,808 A | * | 7/1973 | Trembley .............. F16B 31/021 411/432 |
| 3,799,584 A | * | 3/1974 | Slocum ................ F16L 19/065 285/45 |
| 3,910,588 A | | 10/1975 | Austin |
| 4,654,913 A | | 4/1987 | Grube |
| 4,737,058 A | * | 4/1988 | Callman ................ B60B 35/18 411/120 |
| 4,979,857 A | | 12/1990 | Wing |
| 5,203,656 A | * | 4/1993 | McKinlay ............... F16B 39/24 411/149 |
| 5,219,255 A | * | 6/1993 | Hussain .................. F16B 39/34 411/361 |
| 5,674,034 A | * | 10/1997 | Bennett .................. F16B 39/10 411/120 |
| 6,095,735 A | * | 8/2000 | Weinstein ............... F16B 39/10 411/197 |
| 6,296,431 B1 | | 10/2001 | Miller |
| 6,554,552 B2 | * | 4/2003 | McKinlay ............... F16B 39/26 411/134 |
| 8,777,538 B2 | | 7/2014 | Strizki et al. |
| 9,212,682 B2 | | 12/2015 | Yamazaki |
| 2003/0194294 A1 | | 10/2003 | Wilson |
| 2006/0029485 A1 | * | 2/2006 | Weinstein ............... F16B 39/10 411/121 |
| 2006/0233627 A1 | * | 10/2006 | Weinstein ............... F16B 39/04 411/369 |
| 2008/0022505 A1 | | 1/2008 | Vogel et al. |
| 2008/0038076 A1 | | 2/2008 | Turner et al. |
| 2010/0040430 A1 | | 2/2010 | McKinlay |

OTHER PUBLICATIONS

International Search Report of PCT Patent Application No. PCT/AU2014/001042 dated Jan. 27, 2015.
Retaining Ring Applicaiton Samples, Archive Website—Smalley, Dec. 3, 2016.
Wayback Machine, Smalley Website Search Results.
Other types of nuts locking.
Extended European Search Report of European Patent Application No. 16829504.6 dated Mar. 1, 2019.

* cited by examiner

LOCKING NUT OR BOLT AND WASHER

FIELD OF THE INVENTION

The invention relates to an improved locking nut or bolt and washer. The improved locking nut or bolt and washer of the present invention is particularly suited to use with grinding mills used in the mining industry.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

Nuts and bolts are often used industrially as means of securing articles together (typically large scale equipment). In the case of mining equipment, one such use is as means of securing together a grinding mill.

A grinding mill typically uses a combination of grinding balls and water to mill ore. Due to the high impact nature of the process that takes place inside the grinding mill, the internal surface of the grinding mill is adorned with liner plates. These liner plates are typically installed by way of threaded bolts that penetrate the shell of the grinding mill. To facilitate this arrangement, a plurality of apertures are provided in the shell of the grinding mill.

As the size of the threaded bolt may not be known in advance, these apertures have to be of sufficient size to handle a variety of sized bolts. This leads to a further problem in that water, and other material, can then leak from the mill by way of the potentially large gap that is formed between the aperture and the bolt.

To prevent this leakage, a washer—referred to in the industry as a cup washer—is positioned in between the bolt and the nut. The washer must be of greater size than the aperture so as to seal off any gap that may be formed.

The problem with this arrangement is two fold:

When the mill needs to be disassembled for shutdown or other maintenance related purposes, the nut need first be removed to allow the cup washer to be removed thereafter;

The cup washer incorporates a sealing material (such as an elastomer), which due to the environment in which it is placed, often deforms and fails to seal off the aperture. At the very least this causes difficulties in seeking to remove the cup washer as well as potential leakage from the mill during operation.

The end result of these problems is that significant time (generally in the order of five (5) to six (6) minutes) is spent in seeking to remove a single commonly used cup washer and nut. When considering that a mill may have upwards of three hundred (300) such cup washers and nuts about its surface, this means that any reduction in the time needed to remove a cup washer and nut will have significant productivity advantages.

In an attempt to achieve such advantages, one solution proposed is the cup washer retailed under the trade mark ELINGOL® by Ingenieria Innovaciones Technologicas ("IIT") of Chile and the subject of Chilean patent application 182-2011.

The ELINGOL® cup washer is a substantially toroid shaped article. Protruding from the exterior surface of the toroid is an assembly projection. The assembly projection is designed to mate with a special tool and it is through the actions of this special tool that the ELINGOL® cup washer can be installed or removed as required.

The problems with this approach is as follows:

The nut still needs to be removed separately by means of conventional removal tools. This means that time can be lost where a single operator seeks to remove a cup washer due to the need to change between tools.

The maintenance worker needs to be in possession of the special removal tool. This further increases the costs of the system as a whole—not just in monetary terms, but also in terms of storage costs, safety, etc.

Due to the high torque and speed of the removal tool, if it is not properly mated to the assembly projection and disengagement ensues, there is significant potential for injury to the maintenance worker.

Even if properly mated, if the maintenance worker overruns the removal tool, the washer can completely disengage the bolt. This poses a potentially deadly situation as the washer may be projected by the engaging arm of the removal tool in a random direction.

It is therefore an object of the present invention to create a combination of nut and washer that alleviates, if not completely solves, one or more of the aforementioned problems.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the invention there is an improved locking nut and sealing washer for use with a threaded bolt, where:

the locking nut has a flange and the sealing washer Is attached to an elastomer and has a retaining means provided therein, where, when the locking nut is seated on the sealing washer, a removable retaining insert may be manipulated to be received within the retaining means and where, when force is applied to the locking nut to move the locking nut in a first direction along the threaded bolt, the flange pushes against the sealing washer to put the sealing washer in the same direction and, when force is applied to the locking nut in an opposing direction along the threaded bolt, the flange pushes against the retaining insert to push the sealing washer in the same direction.

The retaining means may take the form of a retaining groove and the retaining insert may be a retaining ring. Alternatively, the retaining means may be a plurality of threads and the retaining insert is a dust seal that can threadedly engage the plurality of threads. Preferably, the dust seal has a hardened portion and an elastomeric portion, the hardened portion operable to make contact with the flange when force is applied to the locking nut in the opposing direction along the threaded bolt and the elastomeric portion is operable to seal off an area between the sealing washer and the locking nut.

The sealing washer ideally has a floor for seating the locking nut and part of the elastomer extends beyond the floor deforms to create a seal when the locking nut is seated on the floor. Similarly, the sealing washer may have a shoulder, the shoulder operable to constrain the elastomer when it deforms and direct deformation o the elastomer towards the threaded bolt and thereby seal same.

The elastomer may have a substantially flat surface having a plurality of elastomeric rings provided thereon, the rings operable to make contact with a surface the threaded bolt engages when the locking nut fully engages the threaded bolt. The elastomer may also be bonded to the sealing washer or mechanically connected to the sealing washer.

The elastomer may have a metal locator, the metal locator operable to facilitate an interference fit between the elastomer and the sealing washer.

The locking nut preferably has a collar and the sealing washer has a retaining wall in which the retaining groove is provided, the height of the collar being greater than the height of the retaining wall when the locking nut is seated on the sealing washer.

The sealing washer may be adapted to seat a squirter and the locking nut may be adapted to be seated on the squirter. Employment of a squirter should be matched with the retaining wall having a plurality of bleeder holes provided therein such that dye released by the squirter is able to pass through at least one bleeder hole. The plurality of bleeder holes should be arranged asymmetrically around the retaining wall.

The sealing washer preferably has a floor for seating the locking nut and a retaining wall in which the retaining means is provided, the distance between the floor and the retaining means being at least one and a half times the thread pitch of the threaded bolt. If a squirter is employed, the distance between the floor and the retaining means should be at least equal to the height of the squirter and one and a half times the thread pitch of the threaded bolt.

The sealing washer may be further adapted to seat a locking washer.

A seal may also be used, the seal creating an interference fit between the locking nut and the sealing washer at a position above the retaining means. The locking nut may include a curved recess and the sealing washer may also include a curved recess above the retaining means, the seal being deformable so as to allow it to be positioned between the curved recesses.

A cover may also be used, the cover operable to cover at least the improved locking nut when seated on the sealing washer.

The sealing washer may have an inwardly declining seat and the locking nut may have an inwardly declining undersurface, the inwardly declining undersurface of the locking nut able to make contact with the inwardly declining seat so as to facilitate retention of an angled threaded bolt. This may also be achieved by the use of an inwardly declining undersurface insert and an inwardly declining seat insert. In both cases, the threaded bolt to be retained can be angled up to 12° to the perpendicular.

In accordance with a second aspect of the present invention there is an improved locking bolt and sealing washer, where:
the locking bolt has a bolt head having a flange and
the sealing washer Is attached to an elastomer and has a retaining groove provided therein,
where, when the bolt head is seated on the sealing washer, a removable retaining ring may be manipulated to be received within the retaining groove and where, when force is applied to the bolt head in a first direction, the flange pushes against the sealing washer to push the sealing washer in the same direction and, when force is applied to the bolt head in an opposing direction, the flange pushes against the retaining ring to push the sealing washer in the same direction.

In accordance with a third aspect of the present invention there is an improved locking nut and sealing washer for use with a threaded bolt, where the sealing washer is permanently connected to the improved locking nut and the sealing washer has an elastomer and a shoulder, the shoulder operable to constrain the elastomer when it deforms and direct deformation of the elastomer towards the threaded bolt and thereby seal same.

BRIEF DESCRIPTION OF THE DRAWINGS

The invention will now be described, by way of example only, with reference to the accompanying drawings, in which.

PREFERRED EMBODIMENTS OF THE INVENTION

Figure 1:
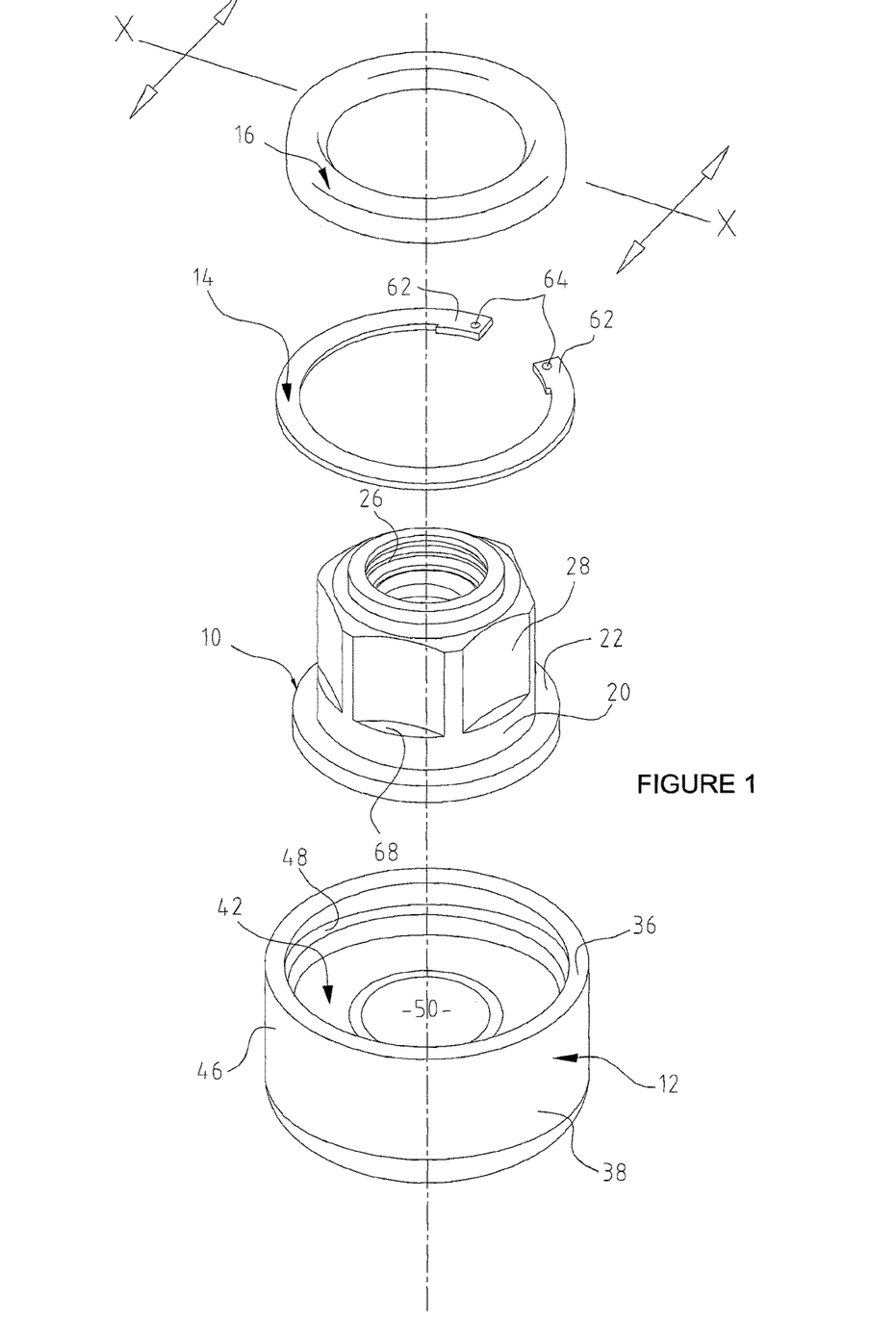
FIG. 1 is an exploded view of an improved locking nut and sealing washer according to a first embodiment of the present invention.
Figure 2:
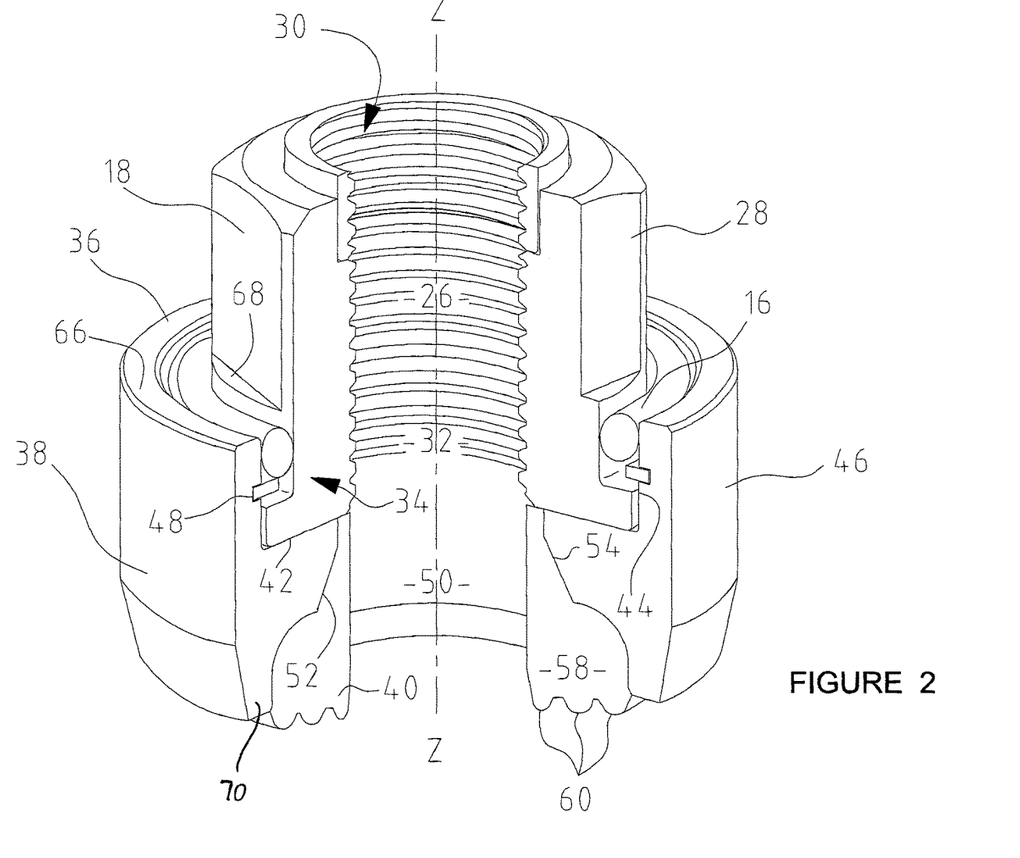
FIG. 2 is a cross-sectional view of an assembled locking nut and sealing washer as shown in FIG. 1.

In accordance with a first embodiment of the invention there is an improved locking nut 10, a sealing washer 12, a retaining ring 14 and a seal 16. The combination, as assembled, is shown in FIG. 2.

The locking nut 10 comprises a body 18, a collar 20, a flange 22 and a retainer 24.

The body 18 has an interior profile 26 and an external profile 28. The external profile 28 is hexagonal in shape when viewed in cross-section about plane X-X. The interior profile 26 is circular in shape when viewed in cross-section about plane X-X.

In this manner the interior profile 26 represents the entrance to a threaded aperture 30. The threaded aperture 30 extends the full length of the internal profile 26 and an internal profile 32 of the collar 20.

In this embodiment the retainer 24 takes the form of a metal ring and assumes the role of metal ring (14) in United States Patent Application 2013/0129444 assigned to Security Locknut LLC of Mundelein, Ill.

When viewed in cross-section about plane X-X, the collar 20 is of roughly the same dimension as body 18. The flange 22 extends about the circumference of the collar 20 at end 34.

The flange 22 is circular in shape when viewed in cross-section about plane X-X. However, in comparison to the same cross-sectional view of the body 18 and collar 20, the flange 22 is of larger diameter.

The sealing washer 12 is comprised of a retainer wall 36, a washer body 38 and an elastomer 40. The retainer wall 36 extends from the periphery of a first side 42 of the washer body 38.

The retainer wall 36 has an internal surface 44 and an external surface 46. The internal surface 44 has a retaining groove 48. The retaining groove 48 is positioned in the internal surface 44 at a height (H) from the first side 42. In this embodiment, this height (H) is one and a half times the thread pitch of threaded aperture 30.

The external surface 46 forms a flush surface with the external surface of the washer body 38.

An aperture 50 also extends through each of the washer body 38 and the elastomer 40. The aperture 50 and each of the washer body 38 and elastomer 40 are concentric about axis Z-Z.

When viewed in cross-section about plane X-X, the distance between opposing points of the internal surface 44 is equal to, or minimally larger than the external diameter of the flange 22.

Figure 4:
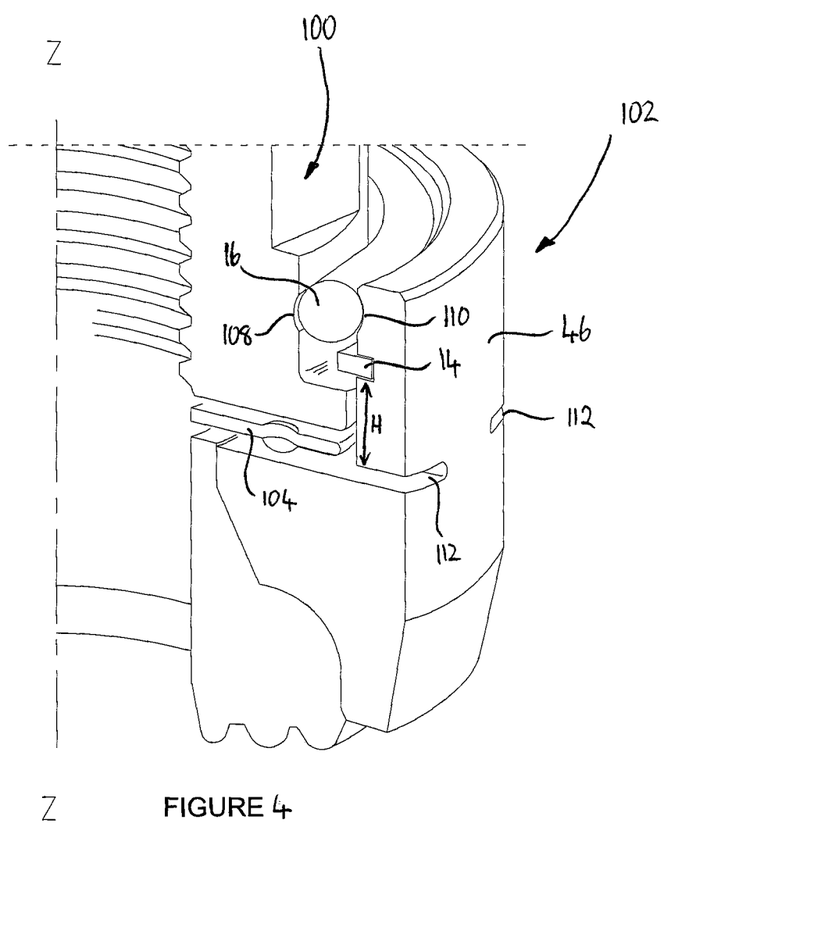
FIG. 4 is an enlarged cross-sectional view of an assembled locking nut and sealing washer according to a second embodiment of the present invention.

The elastomer 40 has an internal profile 52 that matches an internal profile 54 of the washer body 38. The elastomer 40 is bonded to the washer body 38 by way of the internal profiles 52, 54. In this arrangement, part of the elastomer 40 is stepped relative to first side 42 and does not extend as far as external surface 46. This is best illustrated in FIG. 4, but note that this shows a second embodiment of the invention. The reason for stepping the elastomer 40 is explained in more detail below.

A lower portion 58 of the elastomer 40 is formed from a plurality of rings 60. The role of the rings 60 are also described in more detail below.

The elastomer 40 in this embodiment is a non-stick elastomer.

The retaining ring 14 is curved in shape almost to the point of being a full circle. Each end of the retaining ring 14 terminates in a lug 62. A hole 64 is provided centrally within the lug 62.

The seal 16 takes the form of an "O"-ring. The seal 16 will be described in more detail below.

This first embodiment will now be described in the context of its intended use.

The repairer (not shown) inserts the locking nut 12 into the sealing washer 14. In this position, flange 22 is close to, if not in actual, contact with retainer wall 36. At the same time, top 66 of collar 20 is slightly higher in height than top 68 of the retainer wall 36.

With the locking nut 12 appropriately placed within the sealing washer 14, the repairer deforms the retaining ring 14 using a set of circlip pliers (not shown) so as to move the lugs 62 closer to each other. In this constricted state, the retaining ring 14 can be installed over the body 18 to a position around the collar 20. As would be known to the person skilled in the art, when the retaining ring 14 reaches this position, the repairer is no longer able to apply the force necessary to maintain the retaining ring 14 in its constricted state. This causes the retaining ring 14 to expand back to its normal shape.

Expansion of the retaining ring 14 causes the retaining ring 14 to make contact with the internal surface 44 of the retainer wall 36. If appropriately positioned, this contact still provides some slight compression to the retaining ring 14. This compression causes the retaining ring 14 to work its way up the internal surface 44 until the retaining ring 14 is securely received within the retaining groove 48. Due to the retaining groove 48 having a matching profile to the retaining ring 14, when this occurs, the retaining ring 14 is securely received within the retaining groove 48.

It is to be noted that when the retaining ring 14 is securely received within the retaining groove 48, lugs 62 project sufficiently out from the retaining groove 48 as to provide free access to holes 54. This is important to facilitate later removal of the retaining ring 14 as will be described in more detail below.

The seal 16 is then inserted so as to seal the space between the collar 20 and the retainer wall 36 above the retaining ring 14.

The repairer then locates a threaded bolt (not shown) on the external surface of a mill (not shown). Once located, the improved locking nut 10 and sealing washer 12 is placed over the threaded bolt such that the threaded bolt can threadedly engage threaded aperture 30. In this initial placement, it is only the stepped part of the elastomer 40 that makes contact with the first side 42.

A standard pneumatic tool (not shown), fitted with an appropriate hexagonal nut removal adaptor (also not shown) for engagement with external profile 28, both of which would be readily known to the person skilled in the art, is then used to secure the improved locking nut 10 and sealing washer 12 to the external surface.

To elaborate, when torque is applied to the external profile 28 in the appropriate direction to engage the threads of threaded aperture 30 the collar 20 and flange 22 contact the first side 42 of the washer body 38. This contact pushes the sealing washer 12 towards the external surface as further torque is applied to the external profile.

Figure 3:
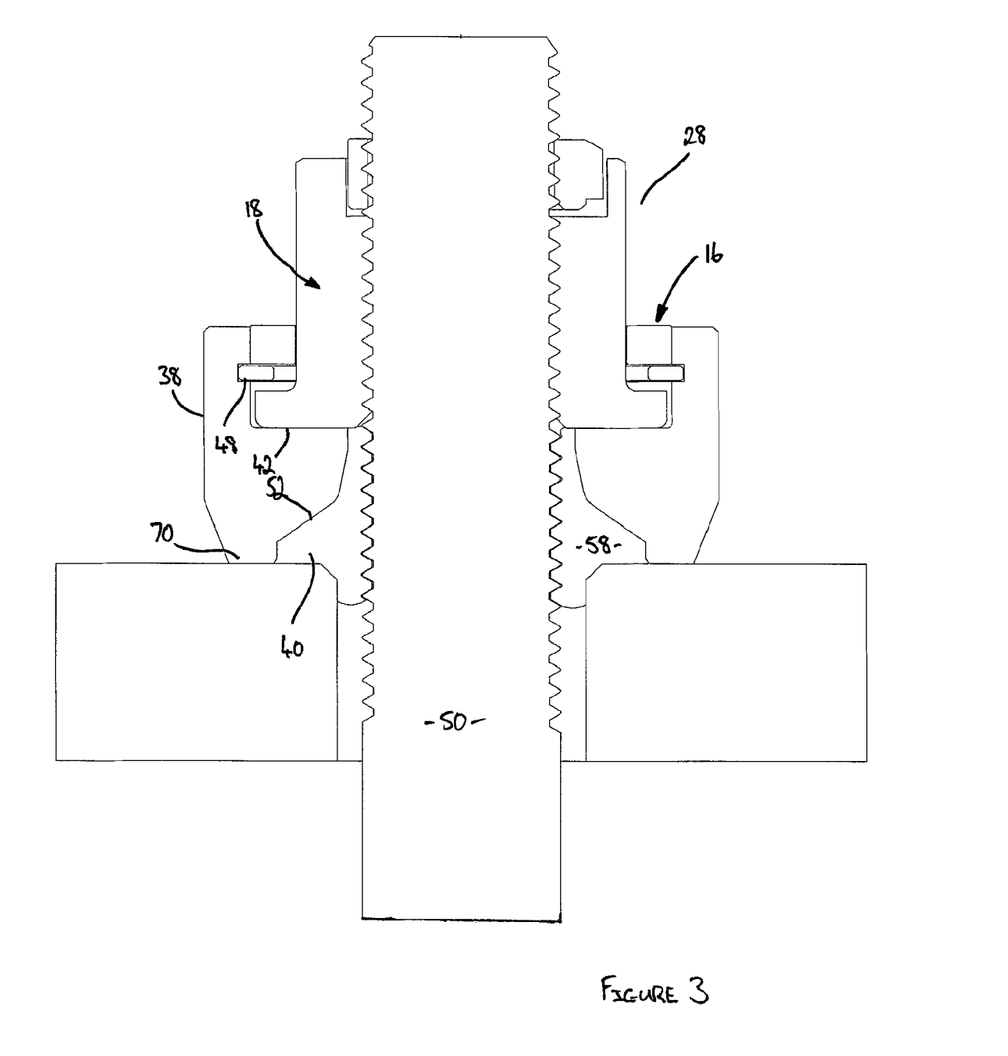
FIG. 3 is a cross-sectional view of an assembled locking nut and sealing washer as shown in FIG. 1 as properly affixed to a mill.

It is to be noted that in securing the improved locking nut 10 and sealing washer 12 to the external surface, two things happen:

(i) the rings 60 of the elastomer 40 deform to take up the space in between. The rings 60 also deform to fill any pits or other irregularities in the external surface. In doing so, the aperture through which the bolt passes to engage the improved locking nut 10 is appropriately sealed; and (ii) the stepped part of the elastomer 40 also deforms but is constrained from spreading beyond the confined of the washer body 38 by reason of shoulder 70 Constraining the elastomer 40 in this manner also results in its deformation being channelled towards the threaded bolt as shown in FIG. 3.

These two actions not only ensure that there is a proper seal for the sealing washer 12 against the mill regardless of the condition of the external surface of the mill, but also acts to prevent particles and/or contaminants from the interior of the mill travelling up the threaded bolt and potentially seizing the locking nut 12.

To remove the connected improved locking nut 10 and sealing washer 12 from the external surface, the aforementioned standard pneumatic tool is placed so that the adaptor mates with external profile 28. Torque is then applied to the external profile 28 in the appropriate direction to disengage the threads of the threaded aperture 30 from the threads of the bolt.

As the threads of the threaded aperture 30 disengage the threads of the bolt, this also acts as a directional force along the Z-Z axis. In this case, as the retaining groove 48 is of a height (H) above the first side 42 greater than one and a half times the thread pitch of threaded aperture 30, the improved locking nut 10 undergoes a full rotation relative to the sealing washer 12 before engaging the retaining ring 14.

As the retaining ring 14 is securely received within the retaining groove 48 this application of force is transferred to the sealing washer 14 by way of the retaining ring 14. Hence, as this force continues, this engagement also draws the sealing washer 12 away from the external surface and allows the elastomer 40 to retract from its position of sealing the threaded bolt.

This means that the torque of the standard pneumatic tool facilitates not only removal of the improved locking nut 10, but also of the sealing washer 12. It also means that only in circumstances where the elastomer 40 has created a bond with the external surface of greater strength than the torque applied by the pneumatic tool that further action may need to be taken by the repairer to remove any excess bond (it being unlikely that the sealing washer 12 will not have been at least partially removed by the pneumatic tool due to the non-stick nature of the elastomer 40 and the high level of torque applied by the pneumatic tool).

It should also be noted here that even if the repairer operates the pneumatic tool for a period that sees the combination of improved locking nut 10 and sealing washer 12 completely disengage the bolt, the combined elements will remain engaged to the pneumatic tool. Thus the safety concerns of the ELINGOL® cup washer system are eliminated.

Following removal of the combined improved locking nut 10 and sealing washer 12, the seal 16 is removed to provide access to the retaining ring 14. The retaining ring 14 is removed by inserting the ends of a pair of circlip pliers (not shown) into each of the holes 64. Once the ends of the pliers engage the holes 64, the pliers can be used to compress the retaining ring 14 and, following compression, to manipulate the retaining ring 14 such that it disengages the retaining groove 48.

In accordance with a second embodiment of the invention, where like numerals reference like parts, there is an improved locking nut 100, a sealing washer 102, a squirter 104, a retaining ring 14 and a seal 16.

The improved locking nut 100 is of identical construction to improved locking nut 10 except for modification of the collar 20. This modification sees part of wall 106 of collar 20 provided with a curved recess 108. This curved recess 108 is of size and shape to match seal 16.

In a similar manner, sealing washer 102 is substantially identical in construction to sealing washer 12. A first point of difference between sealing washer 102 and sealing washer 12 is in the provision of a curved recess 110 in internal surface 44. Again, the curved recess 110 is of size and shape to match seal 16.

The second point of difference between sealing washer 102 and sealing washer 12 relates to the height (H) of the retaining groove 48 relative to first side 42. In this embodiment, the minimum height (H) of the retaining groove 48 is determined by the following formula:

$$H = S + (1.5 \times T)$$

where:

S = the height of squirter 104 (in mm); AND
T = the pitch of the threads of threaded aperture 30.

The third point of difference between sealing washer 102 and sealing washer 12 is the inclusion of a plurality of bleeder holes 112. The bleeder holes 112 are positioned asymmetrically about the external surface 46. Each bleeder hole 112 extends from the external surface 46 through to the internal surface 44. The bleeder hole 112 exits out to the internal surface 44 at a position proximate first side 42.

The squirter 104 is of standard construction as would be readily known to the person skilled in the art.

This second embodiment will now be described in the context of its intended use.

The repairer (not shown) inserts the squirter 104 into the sealing washer 12. The improved locking nut 100 is then inserted over the top of the squirter 104. Again, in this position, flange 22 is close to, if not in actual, contact with retainer wall 36. At the same time, top 66 of collar 20 is slightly higher in height than top 68 of the retainer wall 36.

The retaining ring 14 is then installed over the improved locking nut 100 as described in the first embodiment. The seal 16 is similarly installed over the retaining ring 14, but in this embodiment this requires deformity of the seal 16 to ensure that it is appropriately received within curved recesses 108, 110.

The repairer then locates a threaded bolt (not shown) on the external surface of a mill (not shown). Once located, the improved locking nut 10 and sealing washer 12 is placed over the threaded bolt such that the threaded bolt can threadedly engage threaded aperture 30.

A standard pneumatic tool (not shown), fitted with an appropriate hexagonal nut removal adaptor (also not shown) for engagement with external profile 28, both of which would be readily known to the person skilled in the art, is then used to secure the improved locking nut 10 and sealing washer 12 to the external surface.

To elaborate, when torque is applied to the external profile 28 in the appropriate direction to engage the threads of threaded aperture 30 the collar 20 and flange 22 contact the squirter 104. This in turn causes the squirter 104 to make contact with the first side 42 of the washer body 38. The culmination of these contacts results in the sealing washer 12 being pushed towards the external surface as further torque is applied to the external profile.

When the sealing washer 12 engages the external surface, further torque applied by the pneumatic tool beyond the indicative capacity of the squirter 104 causes the squirter 104 to compress and thus burst the dye reservoirs contained thereon. The burst dye reservoirs shoot the dye in all directions. With bleeder holes 112 located asymmetrically about the external surface 46, at least a portion of the burst dye will pass through at least one of the bleeder holes 112 and thus create a mark on the external surface of the sealing washer 102 and the mill. When the operator notes the mark on the external surface of the sealing washer 102 and/or the mill, the operator uses that visual cue as a sign to stop applying further force to the improved locking nut.

The improved locking nut 100 and sealing washer 102 are then removed using substantially the same process as described in the first embodiment. The key elements of difference here are:
- the need to separately remove the seal 16 by way of deformation so as to ensure that it can disengage the curved recesses 108, 110; and
- the need to separately remove the squirter 104.

Figure 5:
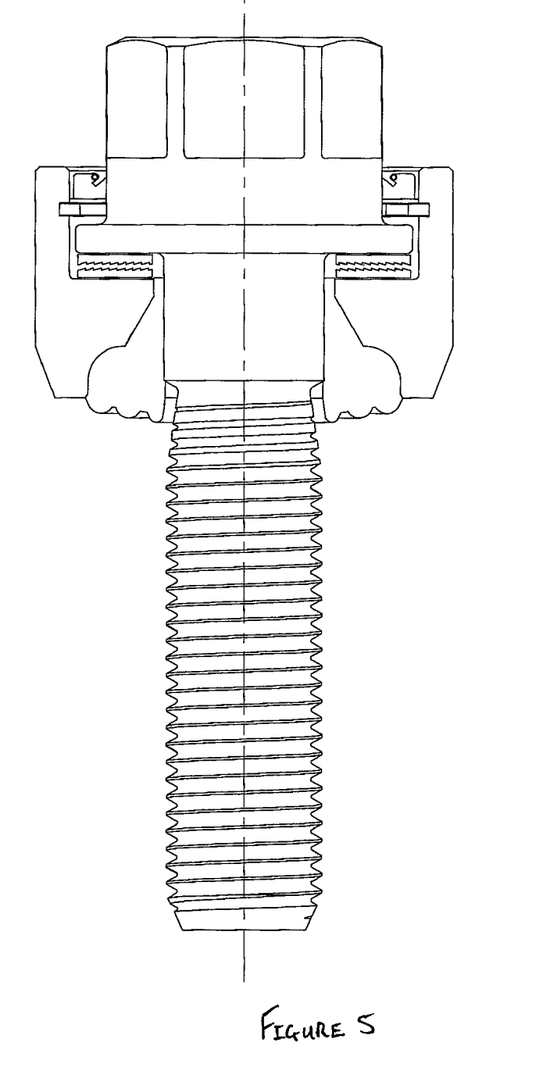
FIG. 5 is an cross-sectional view of an assembled locking nut and sealing washer according to a variant of the second embodiment of the present invention.

Further variants on this second embodiment of the invention are shown in FIG. 5. In the variant as shown in FIG. 5, the squirter 104 is replaced with a locking washer such as any of these types of washers available from Nord-Lock International AB of Malmö, Sweden.

Figure 6:
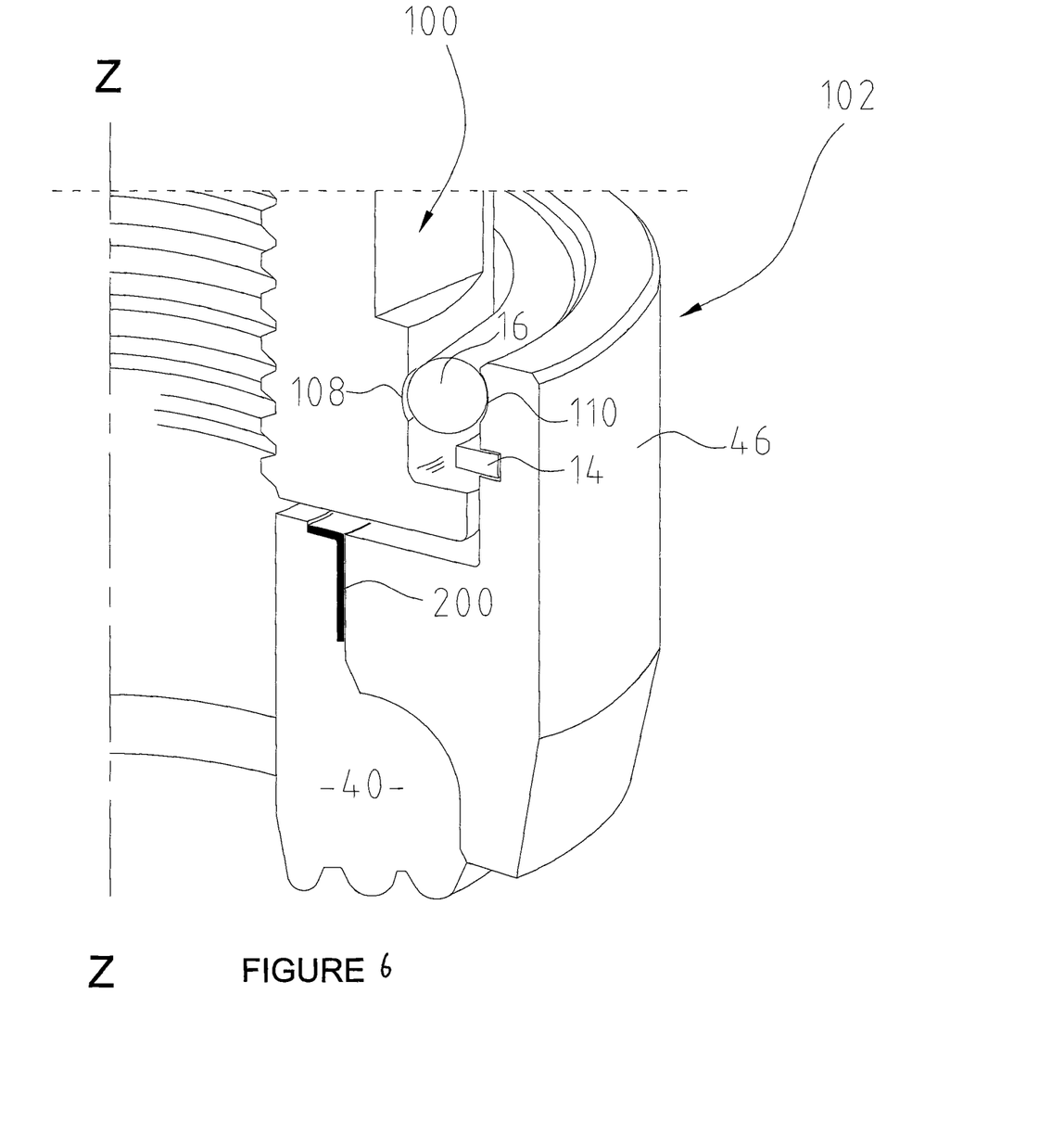
FIG. 6 is an enlarged cross-sectional view of an assembled locking nut and sealing washer according to a third embodiment of the present invention.

In accordance with a third embodiment of the invention, where like numerals reference like parts, the sealing washer 102 is modified such that the elastomer 40 incorporates a metal locator 200. The metal locator 200 is shown in FIG. 6.

The metal locator 200 allows the pre-moulded elastomer 40 to be mechanically connected to the sealing washer 102. In the contemplated embodiment, the metal locator 200 facilitates an interference fit with the first side 42 and the body of the sealing washer 102.

It is to be noted in relation to each embodiment that during the time that the improved locking nut 10,100 and sealing washer 12, 102 remain in contact with the external surface, the seal 16 operates to prevent dust and/or other contaminants from seizing the improved locking nut 10, 100 to the sealing washer 12, 102. Thus, by using the seal 16 in dusty environments (or similar environments where particulates are present in large amounts), disassembly of the improved locking nut 10, 100 from the sealing washer 12, 102 is made significantly easier.

The raising of the elastomer 40 relative to the first side 42 in each embodiment also allows the elastomer 40 to deform when force is applied to it. Deformation of the elastomer 40 in this manner causes the elastomer 40 to act as an additional seal against dirt and contaminants entering into the threaded apertures from the environment generally.

It should also be noted that it is possible for the pneumatic tool to apply such a force to the retaining wall 36 as to crush or otherwise deform the retaining groove 48. This can then prevent removal of the locking nut 12 from the sealing washer 14 or prevent the locking nut 12 from being securely connected to the sealing washer 14 in the future. Thus, to avoid this potential problem, it is important that top 66 of collar 20 is slightly higher in height that the top 68 of the retainer wall 36.

Figure 7:
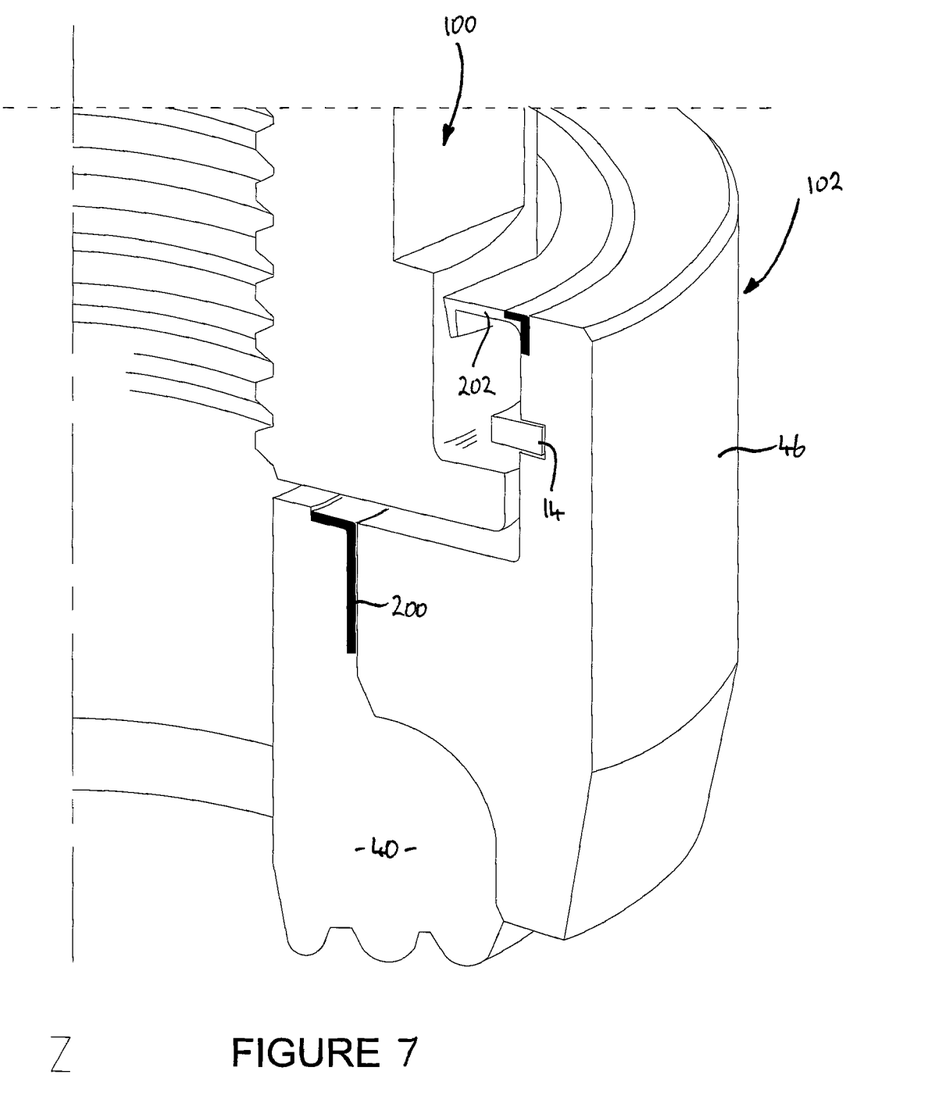
FIG. 7 is a partial cross-sectional view of a variant of the assembled locking nut and sealing washer as shown in FIG. 6.

A further variant of this embodiment is shown in FIG. 7. This Figure illustrates a further additional means of protecting the locking nut and sealing washer against dust contamination. Thus, dust cap 202 in effect acts as a replacement for seal 16.

Figure 8:
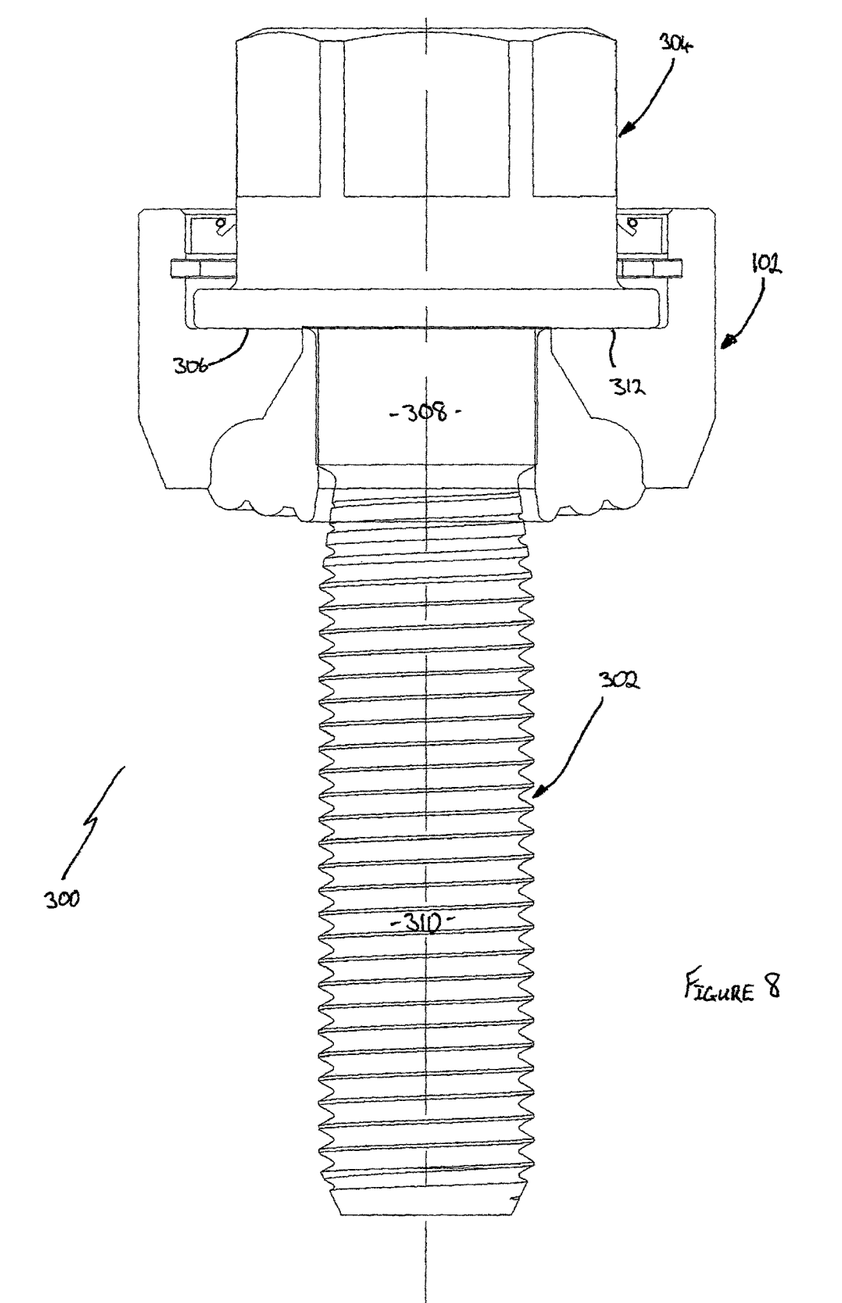
FIG. 8 is a cross-sectional view of an assembled locking bolt and sealing washer according to a fourth embodiment of the present invention.

In accordance with a fourth embodiment of the present invention, where like numerals reference like parts, there is a locking bolt 300 for use with sealing washer 102. The locking bolt 300 as attached to such a sealing washer 102 is shown in FIG. 8.

The locking bolt comprises a shaft 302 and a bolt head 304. The shaft 302 extends from a central position about a non-operational side 306 of the bolt head 304.

The shaft 302 has a smooth portion 308 and a threaded portion 310. The smooth portion 308 connects the threaded portion 310 to the bolt head 304.

The bolt head 304 has an external profile identical to external profile 28.

As would be readily apparent to the person skilled in the art, the locking bolt 300 is inserted into the sealing washer 102 such that the bolt head 304 sits on top of base 312. The bolt head 304 is then secured to the sealing washer 102 in the manner as described to secure the improved locking nut 100 of the second embodiment to sealing washer 102.

Figure 9:
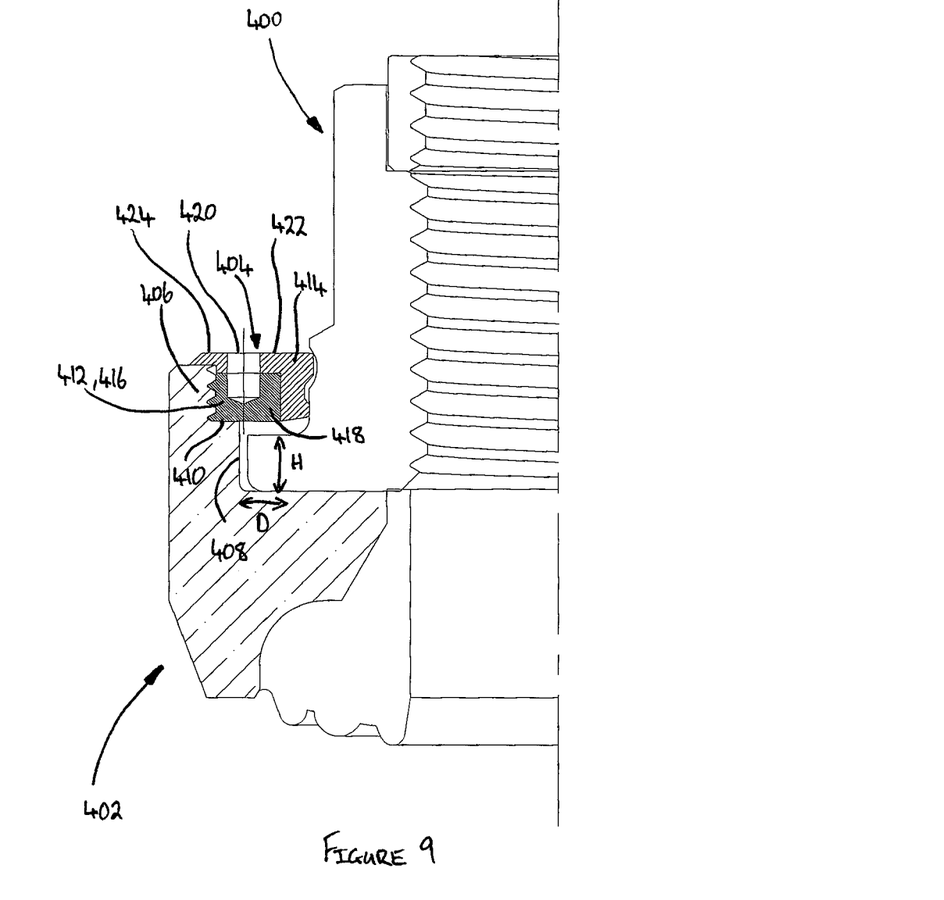
FIG. 9 is a partial cross-sectional view of an assembled locking nut and sealing washer according to a fifth embodiment of the invention.

In accordance with a fifth embodiment of the present invention, where like numerals reference like parts, there is an improved locking nut 400, a sealing washer 402, and a dust seal 404. This embodiment is shown in FIG. 9.

The sealing washer 402 is substantially identical in construction to sealing washer 12. The difference is that the internal surface 44 is divided into an upper internal surface 406 and a lower internal surface 408. The retaining groove 48 is also omitted.

The lower internal surface 408 extends from the first side 42 to a height (H). As with the retaining groove 48, ideally this height (H) is one and a half times the thread pitch of threaded aperture 30.

The upper internal surface 406 is also threaded. The upper internal surface 406 also has a smaller depth (D) relative to the depth (D) of the lower internal surface 408. In this manner, the upper internal surface 406 also operates to define a landing 410.

The dust seal 404 comprises a ring support 412 and an elastomeric portion 414. The ring support 412 is made from a hardened metal. The ring support 412 has a washer side 416, an elastomeric side 418, a plurality of key apertures 420 and a top 422. The washer side 416 is threaded at a pitch that matches the threads of the upper internal surface 406. The elastomeric portion 414 is vulcanised to the top 422 and washer side 416.

Each key aperture 420 is positioned substantially mid-depth of the ring support 412. Each key aperture 420 opens out to top 422. The key apertures 420 terminates approximately mid height (H) of the ring support 412. In this configuration, the four key apertures 420 are positioned equidistant about the dust seal 412.

The elastomeric portion 414 covers the whole top 422 of the ring support 412 excepting the openings to the key apertures 420. Additionally, the elastomeric portion 414 extends to create a sealing flange 424 at a position above washer side 416.

This fifth embodiment of the invention will now be described in the context of its intended use.

As indicated in respect of previous embodiments, the improved locking nut 400 is inserted into the sealing washer 402 such that it sits on top of first side 42. The dust seal 404 is then installed over the top of flange 22 of the sealing washer 402.

A fastening key or keys—such as would be readily known to the person skilled in the art—is then inserted into one or more of the key apertures 420. Using the fastening key or keys, the user is able to manipulate the dust seal such that the threads of the washer side 416 engage with the threads of the upper internal surface 406. This manipulation ideally occurs until such time as the ring support makes contact with landing 410. The user then removes the fastening keys.

In addition to creating a threaded connection between the washer side 416 and the upper internal surface 406, manipulation of the dust seal 404 as described causes the elastomeric portion 414 to deform and seal off external profile 20. It also results in sealing flange 424 operating to seal off the top of retainer wall 36.

By having the ring support 412 made from a hardened metal, the ring support 412 performs a function identical to that of retaining ring 14. Thus, while the ring support 412 remains threadedly engaged with the sealing washer 400, any directional force applied to the locking nut 400 brings the flange 22 into contact with either the first side 42 or the ring support 412 and thus also transfers such directional force to the sealing washer 400.

Figure 10:
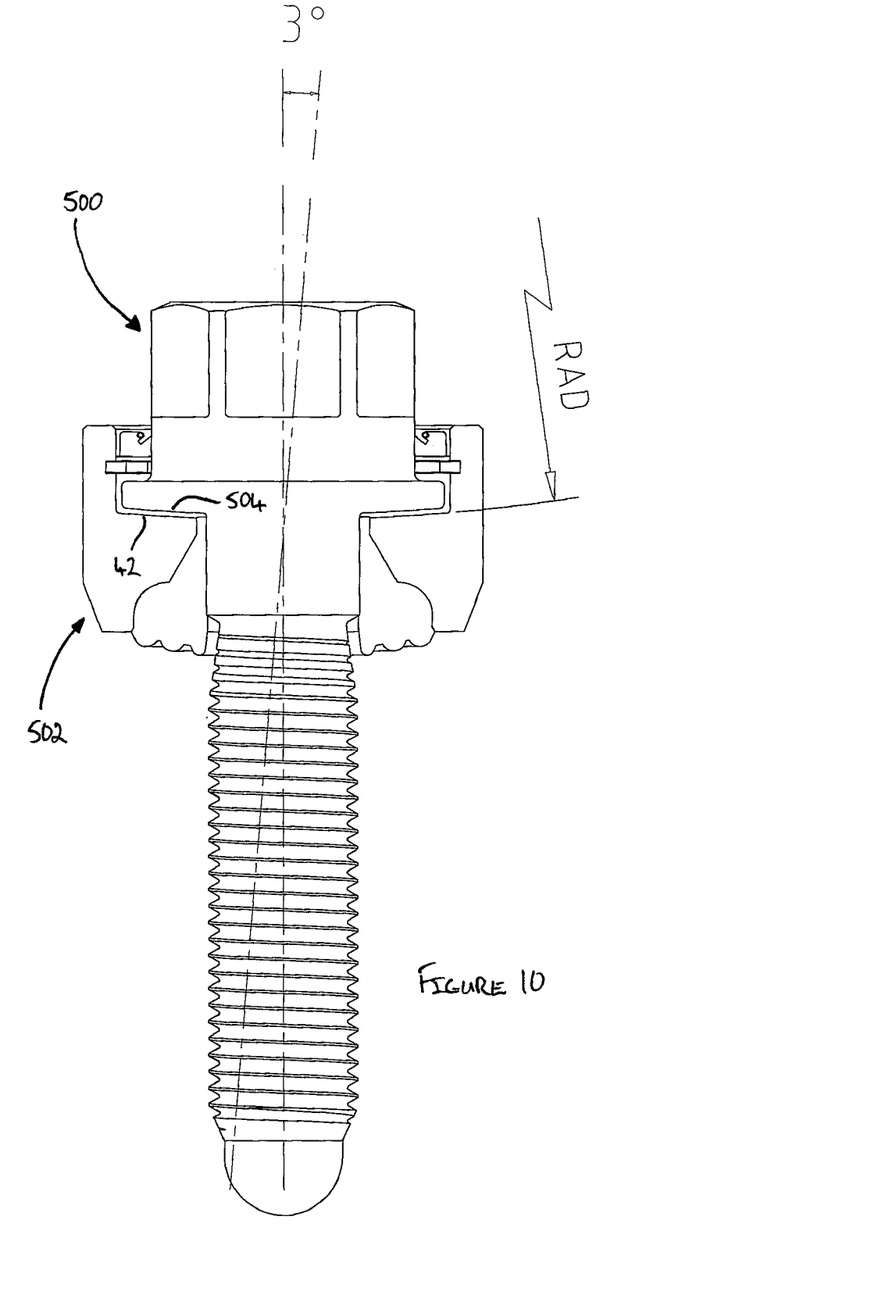
FIG. 10 is a cross-sectional view of an assembled locking bolt and sealing washer according to a sixth embodiment of the invention.

In accordance with a sixth embodiment of the invention, where like numerals reference like parts, there is an improved locking nut 500 and washer 502. The improved locking nut 500 and washer 502 are shown in FIG. 10.

In this embodiment, the first side 42 slopes inwardly towards aperture 50. Similarly, underside 504 of flange 22 has a matching inwardly sloping profile.

By having such matching sloping profiles, the improved locking nut 500 need not be placed square relative to the washer 502 but may be placed at an angle thereto. As is shown in FIG. 10, the offset angle contemplated by this embodiment is up to 3° from the perpendicular.

In this manner, this embodiment of the invention is able to accommodate threaded bolts that extend at an angle to the mill's surface that is not substantially perpendicular.

Figure 11:
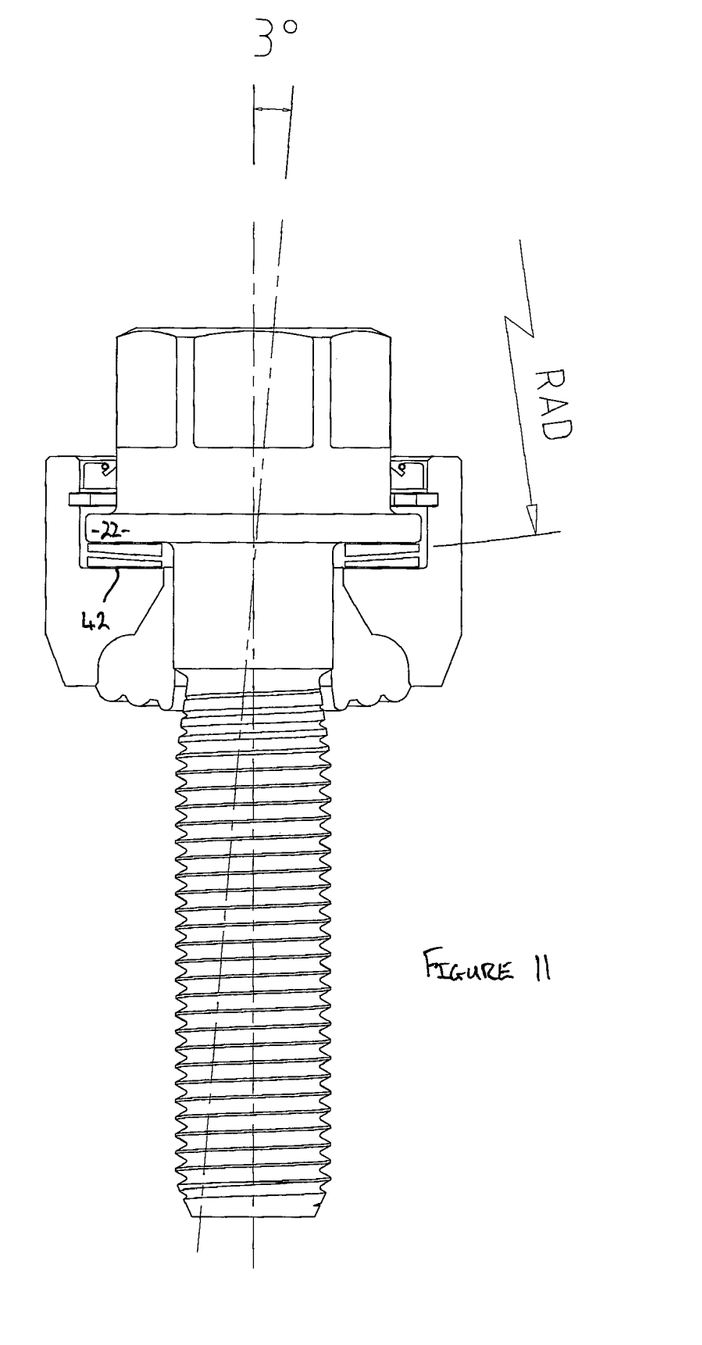
FIG. 11 is a cross-sectional view of a variant of the assembled locking bolt and sealing washer as shown in FIG. 10.

It should be further appreciated by the person skilled in the art that the above invention is not limited to the embodiments described. In particular, the following modifications and improvements may be made without departing from the scope of the present invention:

- While the invention has been described in the context of an alternative to the nut and cup washer arrangements for grinding mills, its use can be applied to any domestic or industrial system where the simultaneous removal of a washer and nut from a bolt is desired.
- The exterior profile 22 of the locking nut 10, 100 may be of a shape other than hexagonal. For instance, the exterior profile 22 may be square, octagonal, or any other desired shape. Similarly, the exterior profile of the bolt head 304 may be any shape, such as those shapes used for 12 point bolt head or socket head-type bolts.
- Seal 16 may be omitted or modified.
- The elastomer 40 need not be non-stick.
- The elastomer 40 may be mechanically connected to the sealing washer 12, 102 in ways other than as described.
- A boot or cover may be used to provide further protection to the combined locking nut 10, 100 and sealing washer 12, 102 from dust and other contaminants.
- The retainer 24 may be omitted or take a form other than as described above.
- The means by which the retaining ring 14 may be inserted and/or removed may modify from that described above. Similarly, the structure by which insertion or removal of the retaining ring 14 may be actioned may also modify from that described above.
- While the applicant has found that the height (H) is ideally equal to 1.5 times the thread pitch of the threaded aperture 30, this is considered to be a minimal height (H) and that larger heights can be employed.
- The bleeder holes 112 may be arranged sequentially about the external surface 46. However, in such a configuration, a greater number of bleeder holes 46 needs to be employed to ensure that when the squirter 104 bursts, the dye is forced through at least one bleeder hole 46. Having so many bleeder holes 46 may impact on the structural integrity of the sealing washer 102.
- As is shown in FIG. 5, the third embodiment can be further modified to omit the "O"-ring seal 16 in favour of a lip seal. The lip seal is of standard construction as would be readily known to the person skilled in the art.
- The smooth portion 308 may be omitted in favour of the threaded portion 310 extended the full length of the shaft 302.
- While it is preferable that the height of the retaining groove 48 relative to first side 42 is ideally 1.5 times the pitch of the threads of threaded aperture 30, where the thread pitch is small, the height of the retaining groove 48 may need to be a larger multiple of the thread pitch.
- The sixth embodiment of the invention can be modified by adjusting the width of the sealing washer 502 and the depth between the first side 42 and the retaining ring 14 or ring support 412. In doing so, it is possible to accommodate a threaded bolt that has an offset angle of up to 12° from the perpendicular.
- The sixth embodiment of the invention can be further modified such that the inward slope of the first side 42 is formed form a separate insert. Similarly, the sloped underside 504 may take the form of a separate insert that cups the flange 22. This modification is shown in FIG. 11.
- Each of the aforementioned embodiments of the invention may be used in conjunction with a dust jacket (not shown). The dust jacket can operate to completely cover the secured locking nut and washer when fastened to the mill. In its ideal form, the dust jacket would still allow for the improved locking nut to be manipulaled while covering same.
- The use of a shoulder as a means of constraining the elastomer when it deforms and direct deformation of the elastomer towards the threaded bolt and thereby seal same can be used with any combination of locking bolt and sealing washer, including locking bolts incorporating a captured sealing washer.

It should be further appreciated by the person skilled in the art that the invention is not limited to the embodiments described above. Additions or modifications described, where not mutually exclusive, can be combined to form yet further embodiments that are considered to be within the scope of the present invention.

I claim:

1. An improved locking nut and sealing washer for use with a threaded bolt, where:
   the locking nut has a flange and
   the sealing washer is attached to an elastomer and has retaining means provided therein,
   where, when the locking nut is seated on the sealing washer, a removable retaining insert may be manipulated to be received within the retaining means and where, when force is applied to the locking nut to move the locking nut in a first direction along the threaded bolt, the flange pushes against the sealing washer to push the sealing washer in the same direction and, when force is applied to the locking nut in an opposing direction along the threaded bolt, the flange pushes against the retaining insert to push the sealing washer in the same direction.

2. An improved locking nut and sealing washer for use with a threaded bolt according to claim 1, where the retaining insert is a dust seal and the dust seal has a hardened portion and an elastomeric portion, the hardened portion operable to make contact with the flange when force is applied to the locking nut in the opposing direction along the threaded bolt and the elastomeric portion is operable to seal off an area between the sealing washer and the locking nut.

3. An improved locking nut and sealing washer for use with a threaded bolt according to claim 1, where the sealing washer has a floor for seating the locking nut and part of the elastomer extends beyond the floor, this part operable to deform to create a seal when the locking nut is seated on the floor.

4. An improved locking nut and sealing washer for use with a threaded bolt according to claim 3, where the sealing washer has a shoulder, the shoulder operable to constrain the elastomer when it deforms and direct deformation of the elastomer towards the threaded bolt and thereby seal same.

5. An improved locking nut and sealing washer for use with a threaded bolt according to claim 1, where the elastomer is mechanically connected to the sealing washer and has a metal locator, the metal locator operable to facilitate an interference fit between the elastomer and the sealing washer.

6. An improved locking nut and sealing washer for use with a threaded bolt according to claim 1, where the sealing washer has a floor for seating the locking nut and a retaining wall in which the retaining means is provided, the distance between the floor and the retaining means being at least one and a half times the thread pitch of the threaded bolt.

7. An improved locking nut and sealing washer for use with a threaded bolt according to claim 1, where the sealing washer is adapted to seat a squirter and the locking nut is adapted to be seated on the squirter.

8. An improved locking nut and sealing washer for use with a threaded bolt according to claim 1, where the sealing washer has an inwardly declining seat and the locking nut has an inwardly declining undersurface, the inwardly declining undersurface of the locking nut able to make contact with the inwardly declining seat so as to facilitate retention of an angled threaded bolt.

9. An improved locking nut and sealing washer for use with a threaded bolt according to claim 8, where the threaded bolt to be retained can be angled up to 12° to the perpendicular.

10. An improved locking bolt and sealing washer, where:
the locking bolt has a bolt head having a flange and
the sealing washer Is attached to an elastomer and has a retaining means provided therein,
where, when the bolt head is seated on the sealing washer, a removable retaining insert may be manipulated to be received within the retaining means and where, when force is applied to the bolt head in a first direction, the flange pushes against the sealing washer to push the sealing washer in the same direction and, when force is applied to the bolt head in an opposing direction, the flange pushes against the retaining insert to push the sealing washer in the same direction.

11. An improved locking bolt and sealing washer according to claim 10, where the retaining insert is a dust seal and the dust seal has a hardened portion and an elastomeric portion, the hardened portion operable to make contact with the flange when force is applied to the locking nut in the opposing direction along the threaded bolt and the elastomeric portion is operable to seal off an area between the sealing washer and the locking nut.

12. An improved locking bolt and sealing washer according to claim 10, where the sealing washer has a floor for seating the bolt head and part of the elastomer extends beyond the floor, this part operable to deform to create a seal when the bolt head is seated on the floor.

13. An improved locking bolt and sealing washer according to claim 12, where the sealing washer has a shoulder, the shoulder operable to constrain the elastomer when it deforms and direct deformation of the elastomer towards the threaded bolt and thereby seal same.

14. An improved locking bolt and sealing washer according to claim 10, where the elastomer is mechanically connected to the sealing washer and has a metal locator, the metal locator operable to facilitate an interference fit between the elastomer and the sealing washer.

15. An improved locking bolt and sealing washer according to claim 10, where the sealing washer has a floor for seating the bolt head and a retaining wall in which the retaining means is provided, the distance between the floor and the retaining means being at least one and a half times the thread pitch of the locking bolt.

16. An improved locking bolt and sealing washer according to claim 10, where the sealing washer is adapted to seat a squirter and the bolt head is adapted to be seated on the squirter.

17. An improved locking bolt and sealing washer according to claim 10, where the sealing washer is adapted to seat a locking washer.

18. An improved locking bolt and sealing washer according to claim 10, where the sealing washer has an inwardly declining seat and the locking nut has an inwardly declining undersurface, the inwardly declining undersurface of the locking nut able to make contact with the inwardly declining seat so as to facilitate angular retention of the improved locking bolt.

19. An improved locking bolt and sealing washer according to claim 18, where the improved locking bolt can be retained at an angle up to 12° to the perpendicular.

* * * * *